(12) United States Patent
Ding et al.

(10) Patent No.: US 10,234,971 B2
(45) Date of Patent: Mar. 19, 2019

(54) TOUCH-DISPLAY PANEL AND TOUCH-DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Hong Ding, Shanghai (CN); Lingxiao Du, Shanghai (CN); Gujun Li, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 154 days.

(21) Appl. No.: 15/374,947

(22) Filed: Dec. 9, 2016

(65) Prior Publication Data
US 2017/0090636 A1 Mar. 30, 2017

(30) Foreign Application Priority Data
May 6, 2016 (CN) .......................... 2016 1 0297874

(51) Int. Cl.
*G06F 3/041* (2006.01)
*G02F 1/1333* (2006.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
None
See application file for complete search history.

(56) References Cited

U.S. PATENT DOCUMENTS

2015/0198835 A1* 7/2015 Kwon ................. G02F 1/13394
349/139
2016/0274716 A1* 9/2016 Liu ................... G02F 1/133345
(Continued)

FOREIGN PATENT DOCUMENTS

CN 204557445 U 8/2015

*Primary Examiner* — Benjamin C Lee
*Assistant Examiner* — Krishna P Neupane
(74) *Attorney, Agent, or Firm* — Anova Law Group, PLLC

(57) ABSTRACT

The present disclosure provides a touch-display panel including a first substrate and a second substrate; a touch electrode layer provided on the first substrate and including a plurality of touch electrodes; a touch signal wire layer including a plurality of touch signal wires. The touch signal wire layer further includes a plurality of dummy touch signal wires. A plurality of spacers is provided on a surface of the second substrate facing the first substrate, wherein the plurality of spacers have a first orthographic projection on the plane of the touch signal wire layer, and the orthographic projection is overlapped with said touch signal wires or the dummy touch signal wires. The touch-display panel provides dummy touch signal wires and the first orthographic projections of the spacer on the plane of the touch signal wire layer are overlapped with the touch signal wires or dummy touch signal wires.

20 Claims, 8 Drawing Sheets

(51) Int. Cl.
*G02F 1/1339* (2006.01)
*G02F 1/1343* (2006.01)
*G06F 3/044* (2006.01)

(52) U.S. Cl.
CPC ...... *G02F 1/13338* (2013.01); *G02F 1/13394* (2013.01); *G02F 2001/13396* (2013.01)

(56) References Cited

U.S. PATENT DOCUMENTS

| | | | |
|---|---|---|---|
| 2017/0090635 A1* | 3/2017 | Kim | G06F 3/0412 |
| 2017/0235396 A1* | 8/2017 | Gong | G06F 3/0412 |
| | | | 349/12 |
| 2018/0004056 A1* | 1/2018 | Park | G02F 1/13338 |

* cited by examiner

US 10,234,971 B2

TOUCH-DISPLAY PANEL AND TOUCH-DISPLAY DEVICE

CROSS-REFERENCES TO RELATED APPLICATIONS

This application claims priority of Chinese Patent Application No. 201610297874.7, filed on May 6, 2016, the entire contents of which are hereby incorporated by reference.

BACKGROUND

As the rapid developments of display technology, touch panels have been very popular all over people's life. As the developments of capacitive touch-display technology, touch electrodes may be directly integrated inside a display panel so as to be integrated with the existed layer structure inside the display panel, thereby significantly lowering the manufacturing cost, increasing the productivity, and reducing the thickness of the panel.

The current liquid crystal display (LCD) device includes a color filter substrate and an array substrate opposed to each other, and a liquid crystal layer between the color filter substrate and the array substrate. There is a frame adhesive provided between the color filter substrate and the array substrate so as to fix these two substrates. Spacers are further provided on the color filter substrate to support a gap between the color filter substrate and the array substrate for better stabilization of the structure.

With respect to an integrated touch-display device, wires for touch signals are provided within the display area for transmitting touch signals to the touch electrodes, while the wires for the touch signals within display area may limit the flexibility of distribution of the spacers. In a practical manufacturing process, some of spacers are disposed above the wires for the touch signals and some of spacers are not disposed above the wires for the touch signals, which may lead to a thicker cell where the spacers are disposed above the wires for the touch signals. The above structure will result abnormality in colors displayed on the touch panel. The above abnormality in colors renders the display quality of the display panel degraded.

BRIEF SUMMARY OF THE DISCLOSURE

In view of the above, the present disclosure provides a touch-display panel and a touch-display device.

In one aspect of the embodiments, the present disclosure provides a touch-display panel including a first substrate and a second substrate; a touch electrode layer provided on the first substrate and including an array of a plurality of touch electrodes insulated from each other; a touch signal wire layer including a plurality of touch signal wires; and a control circuit configured to provide touch signals to the touch electrodes; wherein each of the touch signal wire electrically connects one touch electrode with the control circuit, and each of the touch electrode is electrically connected with at least one touch signal wire. The touch signal wire layer further includes a plurality of dummy touch signal wires. A plurality of spacers is provided on a surface of the second substrate facing the first substrate, wherein the plurality of spacers has a first orthographic projection on the plane of the touch signal wire layer, and the orthographic projection is overlapped with the touch signal wires or the dummy touch signal wires.

In another aspect of the embodiments, the present disclosure provides a touch-display device which includes the touch-display panel as described above.

The touch-display panel and the touch-display device have advantages as follows:

With providing the dummy touch signal wires, the spacers are provided above the touch signal wires and the dummy touch signal wires so as to increase the flexibility of distribution of the spacers, and to solve the problem that the cell thickness is uneven due to the fact that some of spacers are placed above the touch signal wires and some of spacers are not placed above the touch signal wires. Therefore, the touch-display panel provided by the present disclosure could have better display effects.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1A:
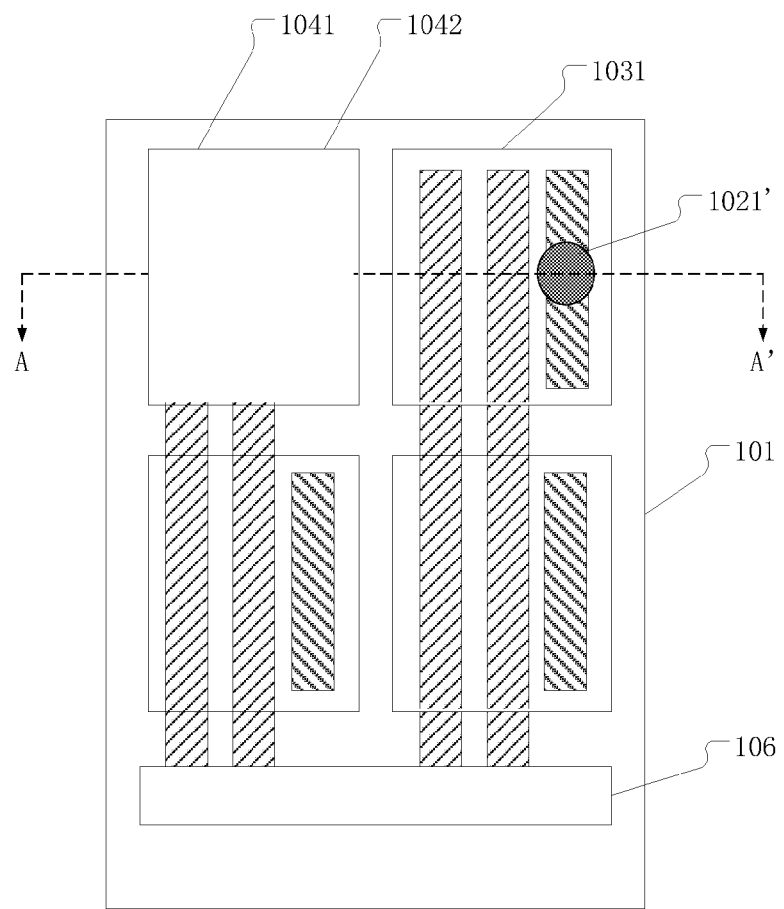
FIG. 1A is a schematic view of an embodiment of the touch-display panel according to the present disclosure.

Detailed description would be made on the present disclosure in connection with the drawings and the embodiments. It should be appreciated that, the embodiments described herein are merely used for explanation of related disclosure, rather than for limitation on the present disclosure. Furthermore, it should be noted that, only parts related to the present disclosure are shown in the drawings for convenience of description.

It should be noted that, the embodiments and features of the embodiments of the present disclosure may be combined with each other without conflicting with each other. In the following, detailed description is made on the present disclosure in connection with the drawings.

Figure 1B:
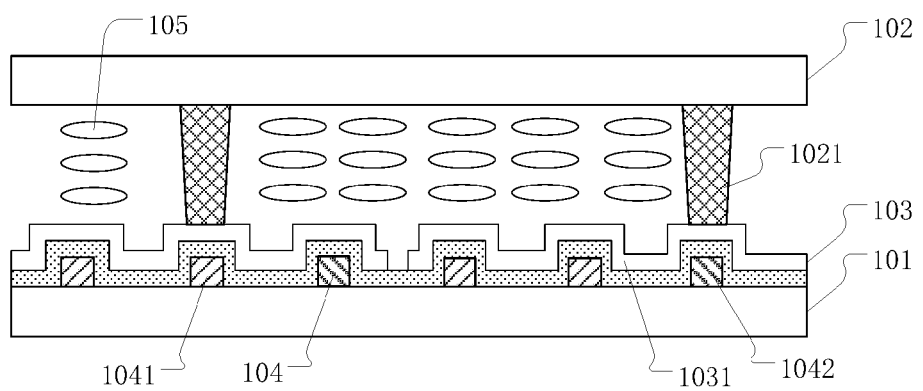
FIG. 1B is a cross-section view taken along line AA' of FIG. 1A.

FIG. 1A is a schematic view of an embodiment of the touch-display panel according to the present invention, and FIG. 1B is a cross-section view taken along line AA' of FIG. 1A. Referring to FIG. 1A and FIG. 1B, a touch-display panel includes a first substrate 101 and a second substrate 102, a touch electrode layer 103 provided on the first substrate 101 and including an array of a plurality of touch electrodes 1031 insulated from each other; a touch signal wire layer 104 including a plurality of touch signal wires 1041; and a control circuit 106 configured to provide touch signals to the touch electrodes 1031; wherein each touch signal wire 1041 is electrically connected with one touch electrode 1031, and each touch electrode 1031 is electrically connected with at least one touch signal wire 1041.

The touch signal wire layer 104 further includes a plurality of dummy touch signal wires 1042. A plurality of spacers 1021 is provided on a surface of the second substrate 102 facing the first substrate 101, and the plurality of spacers 1021 has a first orthographic projections 1021' on the plane of the first substrate 101. The first orthographic projections 1021' are overlapped with the touch signal wires 1041 or the dummy touch signal wires 1042.

It should be noted that, the second substrate and spacers are not shown in FIG. 1A. In FIG. 1B, the touch electrode layer 103 herein refers to a layer structure where the plurality of touch electrodes 1031 are provided, and the touch signal wire layer 104 herein refers to a layer structure where a plurality of touch signal wires 1041 and a plurality of dummy touch signal wires 1042 are provided. Referring to FIG. 1A and FIG. 1B, the first substrate 101 is an array substrate, and structures such as thin film transistor arrays, gate lines, data lines, common electrodes and so on are formed on the first substrate 101.

The second substrate 102 is a color filter substrate, and structures such as color resist layer, black matrix, and so on are formed on the color filter substrate. A liquid crystal layer 105 is sandwiched between the first substrate 101 and the second substrate 102 to achieve a display function of the touch-display panel. The touch electrode layer 103 is provided on the first substrate 101 and includes an array of a plurality of touch electrode 1031 insulated from each other. The touch signal wire layer 104 is further provided on the first substrate 101, and includes a plurality of touch signal wires 1041.

Each touch signal wire 1041 is electrically connected with one touch electrode 1031, and each touch electrode 1031 is electrically connected with at least one touch signal wire 1041. The other end of the touch signal wire 1041 is electrically connected with the control circuit 106 configured to transmit a touch signal to the touch electrode 1031 or receive a touch signal from the touch electrode 1031, thereby achieving a touch function of the touch-display panel.

The touch signal wire layer 104 further includes a plurality of dummy touch signal wires 1042. The dummy touch signal wires 1042 as disclosed herein mean that the dummy touch signal wires 1042 would not render the touch electrodes 1031 and the control circuit 106 electrically connected, and that the dummy touch signal wires 1042 would not transmit touch signals between touch electrode 1031 and the control circuit 106.

In the present embodiment, a plurality of spacers 1021 is provided on a surface of the second substrate 102 facing the first substrate 101. The spacers 1021 are used to support a gap between the first substrate 101 and the second substrate 102 and to maintain the cell thickness of the liquid crystal cell comprising the first substrate 101, the second substrate 102, and the liquid crystal layer 105, and thus the uniformity of display of the touch-display panel is maintained. The plurality of spacers 1021 has a first orthographic projection 1021' on the plane of the touch signal wire layer 104, and the first orthographic projection 1021' is overlapped with the touch signal wires 1041 or the dummy touch signal wires 1042.

In the present embodiment, the first orthographic projection 1021' of the spacers 1021 are provided to be overlapped with the touch signal wires or the dummy touch signal wires, so that the spacers 1021 are provided above the touch signal wires and the dummy touch signal wires. Such structure makes the distribution of the spacers more even without limitation by the distribution of the touch signal wires.

This structure solves the problem that the cell thickness of liquid crystal cell is uneven due to the fact that some of the spacers are placed above touch signal wires without providing the dummy touch signal wires. Therefore, the touch-display panel according to the present disclosure has better display uniformity and display effects.

It should be noted that, in the present embodiment, it is feasible that some of the spacers are provided above the touch signal wires (i.e., the first orthographic projections of some of the spacers on the plane of the touch signal wire layer are overlapped with the touch signal wires), and some of the spacers are provided above the dummy touch signal wires (i.e., the first orthographic projections of some of the spacers on the plane of the touch signal wire layer are overlapped with the dummy touch signal wires).

Figure 2:
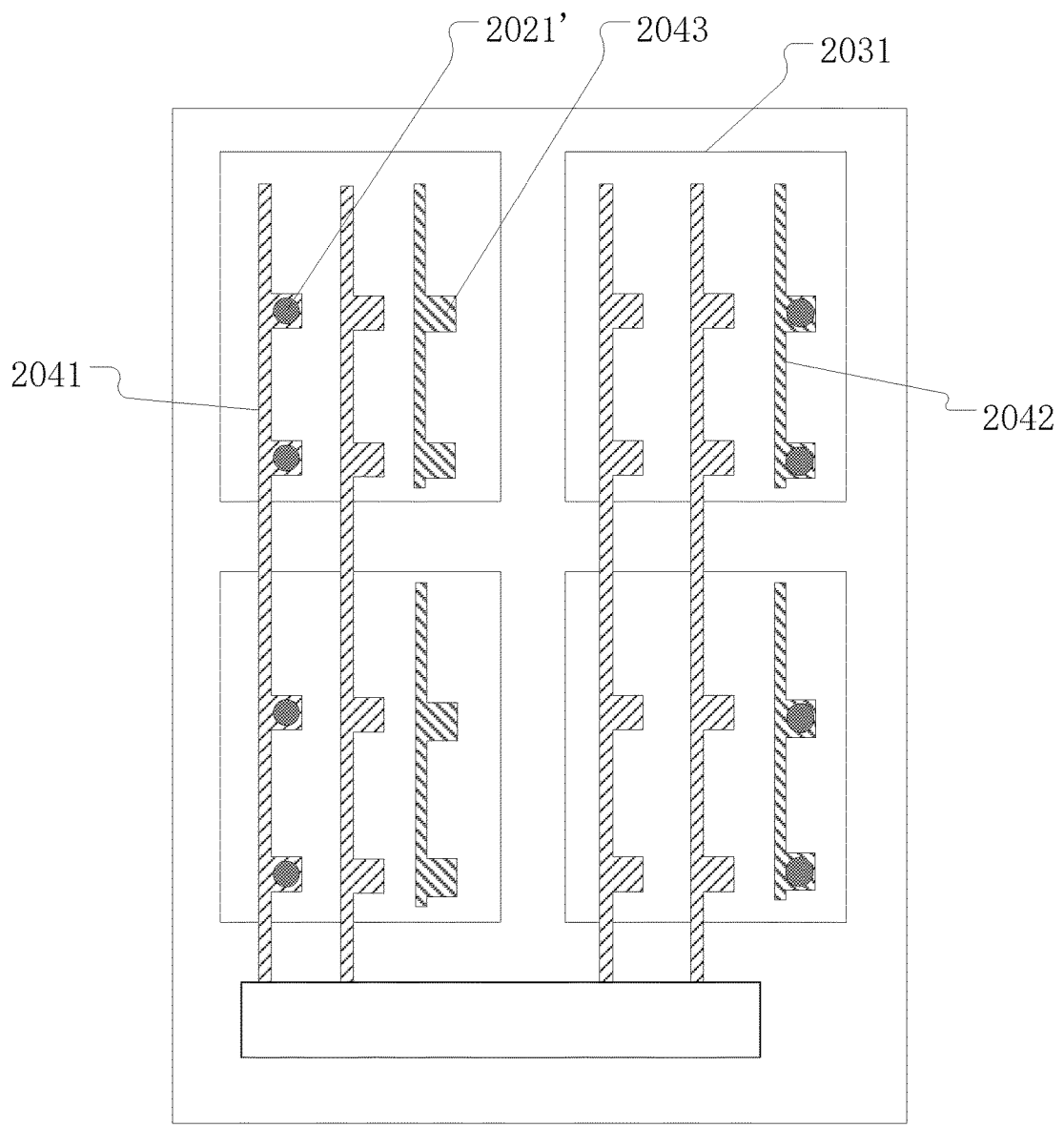
FIG. 2 is a schematic view of another embodiment of the touch-display panel according to the present disclosure.

Furthermore, in the structure as shown in FIG. 1B, the touch electrode layer 103 (i.e., the layer where the touch electrodes 1031 are provided) is closer to the second substrate 102 than the touch signal wire layer 104 (the layer where the touch signal wires 1041 and the dummy touch signal wires 1042 are provided). That is to say, the touch electrode layer 103 is provided above the touch signal wire layer 104 as shown in FIG. 2. However, alternatively, the touch electrode layer 103 is provided below the touch signal wire layer 104 as shown in FIG. 2, and there is no limitation thereon in the present disclosure.

Alternatively, FIG. 2 is a schematic view of another embodiment of the touch-display panel according to the present disclosure. As shown in FIG. 2, the touch signal wires 2041 and/or the dummy touch signal wires 2042 have at least one protrusion 2043, and a first orthographic projection 2021' of the spacers on the plane of the touch signal wire layer is overlapped with the protrusions 2043.

In general, the width of the touch signal wires and the dummy touch signal wires is smaller than the width of the cross-section of the spacers. The protrusions of the touch signal wires and the dummy touch signal wires support the spacers more stably, so as to ensure the stability of the spacers. The touch signal wires and the protrusions thereof or the dummy touch signal wires and the protrusions thereof are formed integrally.

Figure 3:
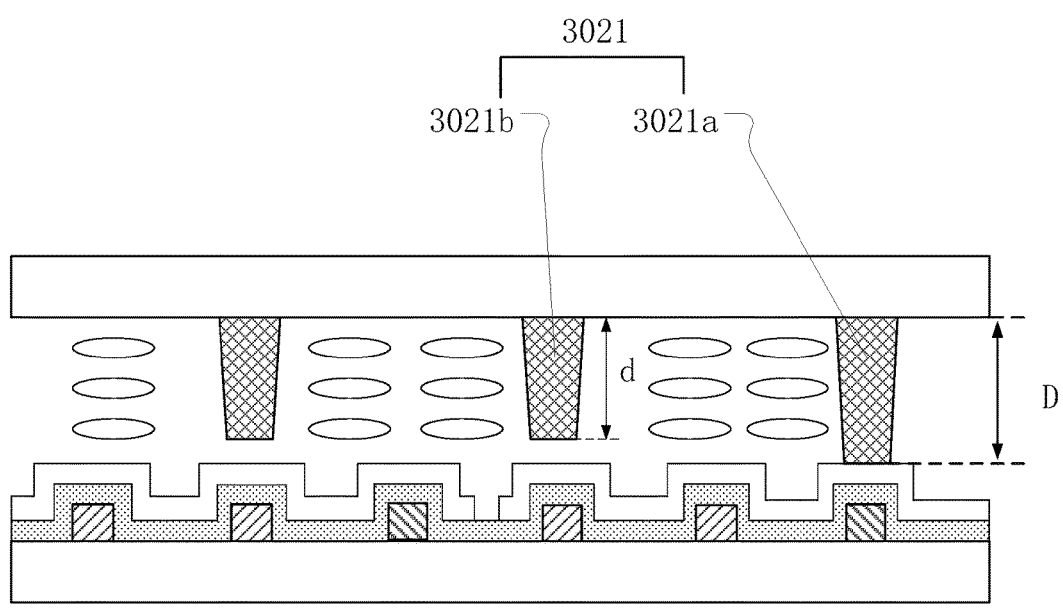
FIG. 3 is a schematic view of still another embodiment of the touch-display panel according to the present disclosure.

Alternatively, FIG. 3 is a schematic view of still another embodiment of the touch-display panel according to the present disclosure. As shown in FIG. 3, the spacers 3021 include primary spacers 3021A and secondary spacers 3021B, wherein the primary spacers 3021A have a height D larger than a height d of the secondary spacers 3021B.

In the present embodiment, the primary spacers 3021A are configured to support the thickness of the liquid crystal cell, and both ends of the primary spacers closely contact with the first and second substrates (the second substrate referred herein includes other layer structure provided on the second substrate). The height d of the secondary spacer 3021B is less than the height D of the primary spacer 3021A. When the touch-display panel is not pressed by an external force, one end of the secondary spacer 3021B contacts with the first substrate or the second substrate, and the other end is suspended.

When the touch-display panel is pressed by an external force, the secondary spacer 3021B will alleviate the external force pressed on the touch-display panel, and thus the touch-display panel is protected from the damage caused by the external force. The first orthographic projections of either primary spacers or secondary spacers are overlapped with the touch signal wires or the dummy touch signal wires so as to maintain the uniformity of distribution of the spacers. The cell thickness of the liquid crystal cell can be more even when there is no external force pressed on the touch-display panel, thereby maintaining an excellent display effect.

Figure 4A:
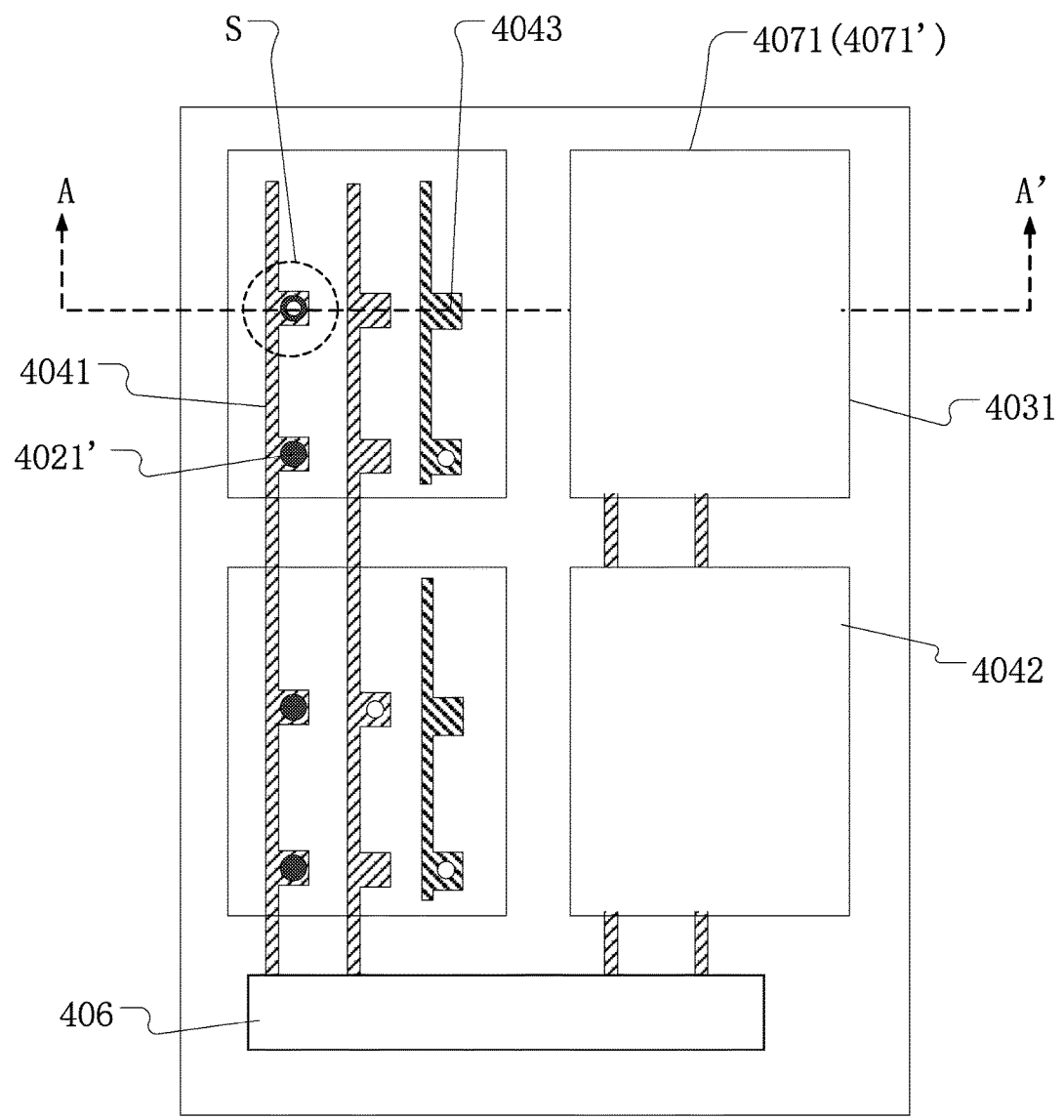
FIG. 4A is a schematic view of one another embodiment of the touch-display panel according to the present disclosure.
Figure 4B:
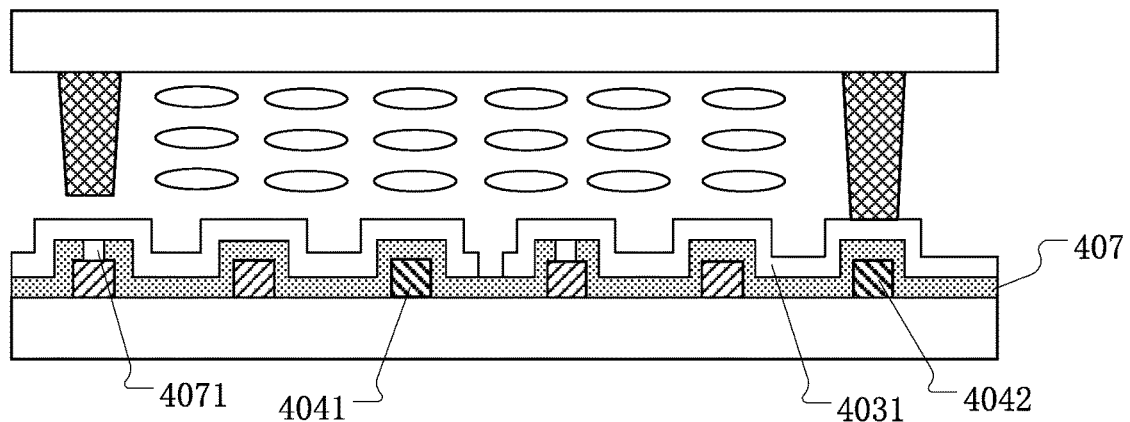
FIG. 4B is a cross-section view taken along line AA' of FIG. 4A.

Alternatively, FIG. 4A is a schematic view of one another embodiment of the touch-display panel according to another the present disclosure, and FIG. 4B is a cross-section view taken along line AA' of FIG. 4A. With reference to FIG. 4A and FIG. 4B, the parts same or similar to those in the above embodiments are omitted to avoid redundant, and the different parts are mainly in that an insulation layer 407 is provided between the touch electrode layer and the touch signal wire layer and have a plurality of via holes 4071, through which the touch signal wires 4041 are electrically connected with the touch electrodes 4031. It should be noted that the second substrate, the insulation layer and the spacers are not shown in FIG. 4A for better clarification.

More particularly, the touch electrode layer includes a plurality of touch electrodes 4031 provided in an array. In the present embodiment, the touch electrodes 4031 are used as self-capacitive touch electrodes, each of which is electrically connected with the control circuit 406 at least through one touch signal wires 4041, and there is an insulation layer 407 provided between the touch electrode layer and the touch signal wire layer. The insulation layer 407 insulates one touch signal wire from the touch electrodes which are not required to be electrically connected with the touch signal wire.

The insulation layer 407 have a plurality of via holes 4071, and the touch signal wires 4041 are electrically connected with corresponding touch electrodes 4031 through the via holes 4071. Alternatively, with reference to FIG. 4A and FIG. 4B, the dummy touch signal wires 4042 are electrically connected with the touch electrodes 4031 through the via holes 4071 in a similar way. However, the dummy touch signal wires would not be connected to the control circuit and not be used to transmit the touch signals.

In the present embodiment, the dummy touch signal wires 4042 are electrically connected with the touch electrodes 4031 so that the electrical potential of the dummy touch signal wires is maintained stable, and the electrical potential of the dummy touch signal wires is not be affected by the data lines, so that the electrical potential of the dummy touch signal wires does not affect the electrical potential of adjacent pixel electrodes so as to maintain the uniformity of displayed screen.

Alternatively, with reference to FIG. 4A, the via holes have a second orthographic projections 4071' on the plane of the touch signal wire layer, which are overlapped with the protrusions 4043. The second orthographic projections 4071' are provided to be overlapped with the protrusions 4043, and the protrusions 4043 have larger widths than those of the touch signal wires or the dummy touch signal wires, thereby maintaining the stability of the electrical connection between the touch signal wires 4041 or the dummy touch signal wires 4042 with the touch electrodes 4031.

It should be noted that, in the present embodiment, the structure where the first orthographic projections 4021' of the spacers on the plane of the touch signal wire layer are overlapped with the protrusions 4043, and the second orthographic projections 4071' of the via holes on the plane of the touch signal wire layer are overlapped with the protrusions 4043 does not mean that the first orthographic projections 4021', the second orthographic projections 4071', and the protrusions 4043 should be overlapped with one another at the same time. It is feasible that the first orthographic projections 4021' are overlapped with some of protrusions 4043, and the second orthographic projections 4071' are overlapped with some other protrusions 4043.

As an alternative embodiment with respect to the present embodiment, the first orthographic projections 4021', the second orthographic projections 4071', and the protrusions 4043 are overlapped with one another at the same time. As shown by the dashed-line circle frame of S in FIG. 4A, when the first orthographic projections 4021', the second orthographic projections 4071', and the protrusions 4043 are overlapped with one another at the same time, the spacers are used as secondary spacers.

Figure 5:
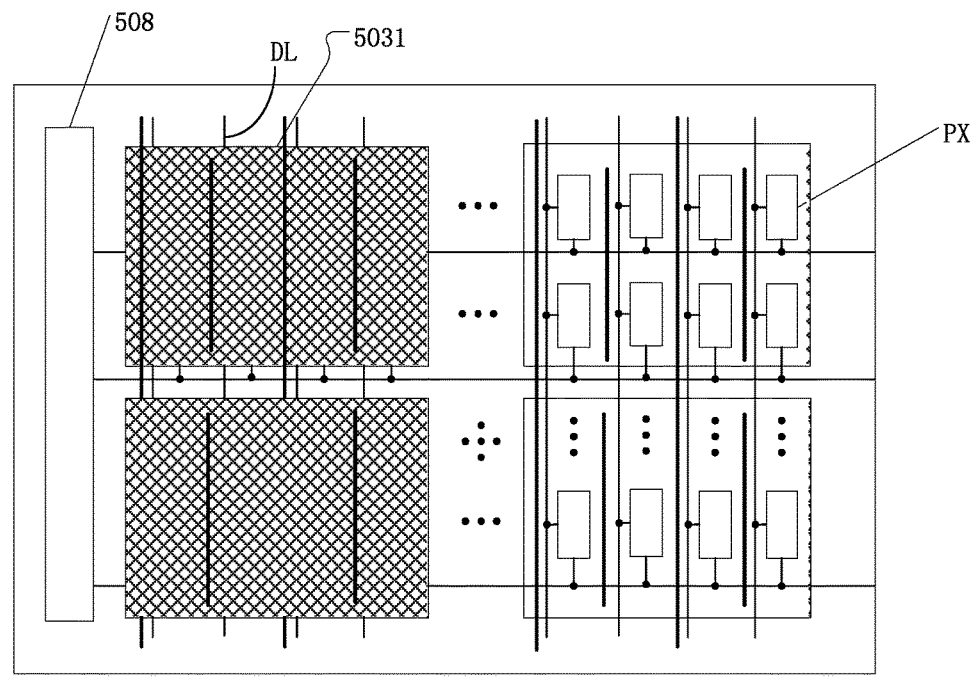
FIG. 5 is a schematic view of at least one embodiment of the touch-display panel according to the present disclosure.

FIG. 5 is a schematic view of at least one embodiment of the touch-display panel according to the present disclosure. As shown in FIG. 5, the touch-display panel further includes a plurality of display pixels PX provided in an array; a plurality of data lines DL configured to transmit display signals to the plurality of display pixels PX; and a plurality of touch electrodes 5031 used as common electrodes during display and configured to provide common signals to the plurality of display pixels PX.

More particularly, each display pixel PX includes a thin film transistor (TFT), a pixel electrode and a common electrode. The drain electrode of the TFT is electrically connected with the pixel electrode, the source electrode of the TFT is electrically connected with the data line DL, and the gate electrode of the TFT is electrically connected with the gate line, the other end of which is connected with the gate drive circuit 508.

When the screen is displayed, the gate drive circuit 508 transmits a driving scanning signal so as to control the TFT to be turned on/off through the gate line. When the TFT is turned on, the display signal is input to the display pixel through the data line DL and received by the pixel electrode. At the same time, the common electrode receives a common signal, and an electrical field is formed between the pixel electrode and the common electrode, so that the display panel is controlled to perform the display. In the present embodiment, a plurality of touch electrodes 5031 are used as common electrodes during display.

During touching, the touch electrodes 5031 receive touch signals and are used as touch electrodes. A plurality of touch electrodes 5031 is used as self-capacitive touch electrodes. In the present embodiment, the common electrodes and the touch electrodes are multiplied so as to reduce processes for integrated touch-display panel and save time and cost for manufacturing.

Figure 6:
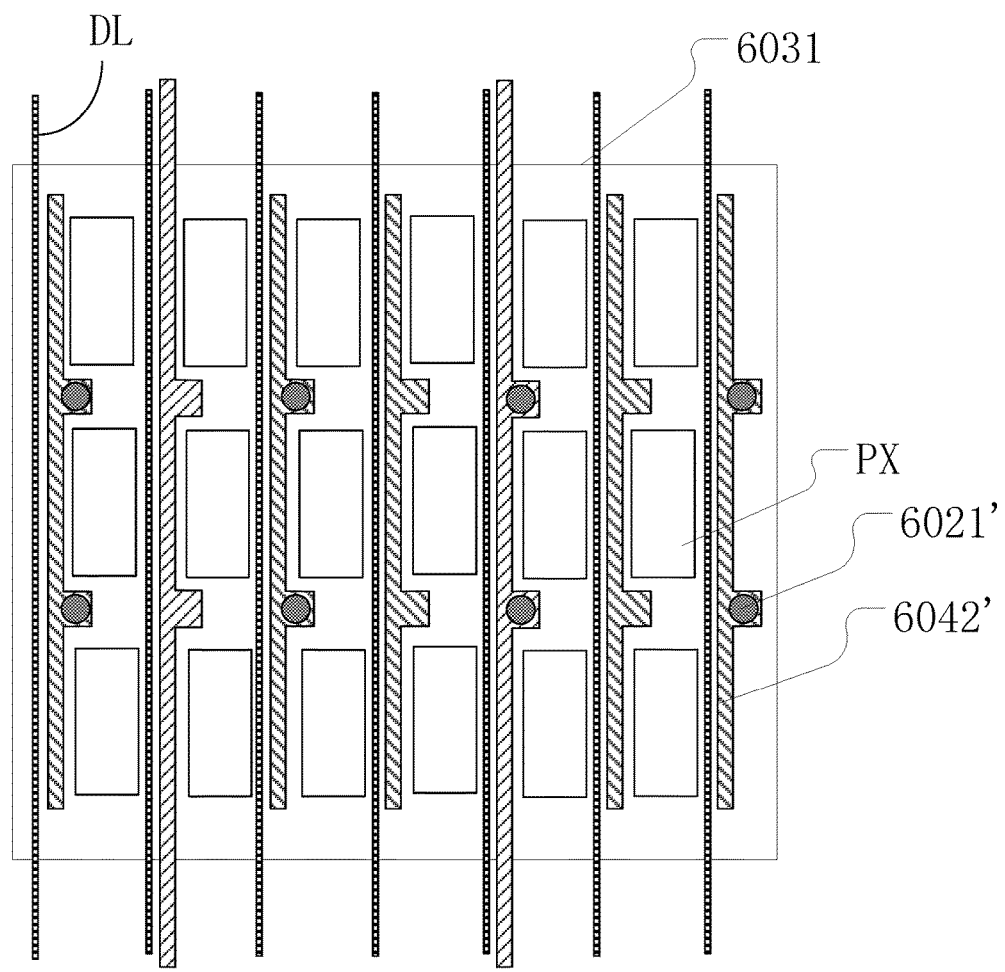
FIG. 6 is a schematic view of at least one embodiment of the touch-display panel according to the present disclosure.

FIG. 6 is a schematic view of at least one embodiment of the touch-display panel according to the present disclosure. As shown in FIG. 6, each dummy touch signal wire has a third orthographic projection 6042' on the plane of the touch electrode layer, and each third orthographic projection 6042' is located within the area of one touch electrode 6031. At least one third orthographic projection 6042' is provided in the area of each touch electrode 6031.

More particularly, with reference to FIG. 6, one touch electrode 6031 is generally corresponding to a plurality of display pixels PX. The spacers are generally distributed between adjacent display pixels, and have relatively higher distribution density. A plurality of dummy touch signal wires is provided in the area of one touch electrode, and the spacers are provided above the touch signal wires or the dummy touch signal wires (the first orthographic projection of the spacers on the plane of the touch signal wire layer are overlapped with the touch signal wire or the dummy touch signal wire). Therefore, the heights of the spacers at each position are maintained the same and thus the display of the screen can be more even.

Alternatively, the touch signal wires and the dummy touch signal wires and the data lines DL have the same extension direction. The touch signal wires or the dummy touch signal wires are provided between two adjacent columns of display pixels. The dummy touch signal wires have a length less than or equal to the length of the touch electrodes in the direction of data lines. In the present embodiment, each second orthographic projection 6042' is provided in the area of one touch electrode 6031. That is, one dummy touch signal wire is not overlapped with two or more touch electrodes at the same time, so that the load capacitance between adjacent touch electrodes is decreased.

It should be noted that, in FIG. 6, there are touch signal wires or dummy touch signal wires provided between any two adjacent columns of display pixels, and such arrangement offers the largest flexibility for arranging the spacers. The spacers are arranged in any distribution form so as to maintain the uniformity of cell thickness of liquid crystal cell. However, such arrangement should not be regarded as limitation on the present disclosure, and there are no touch signal wires or dummy touch signal wires between two columns of display pixels.

Figure 7:
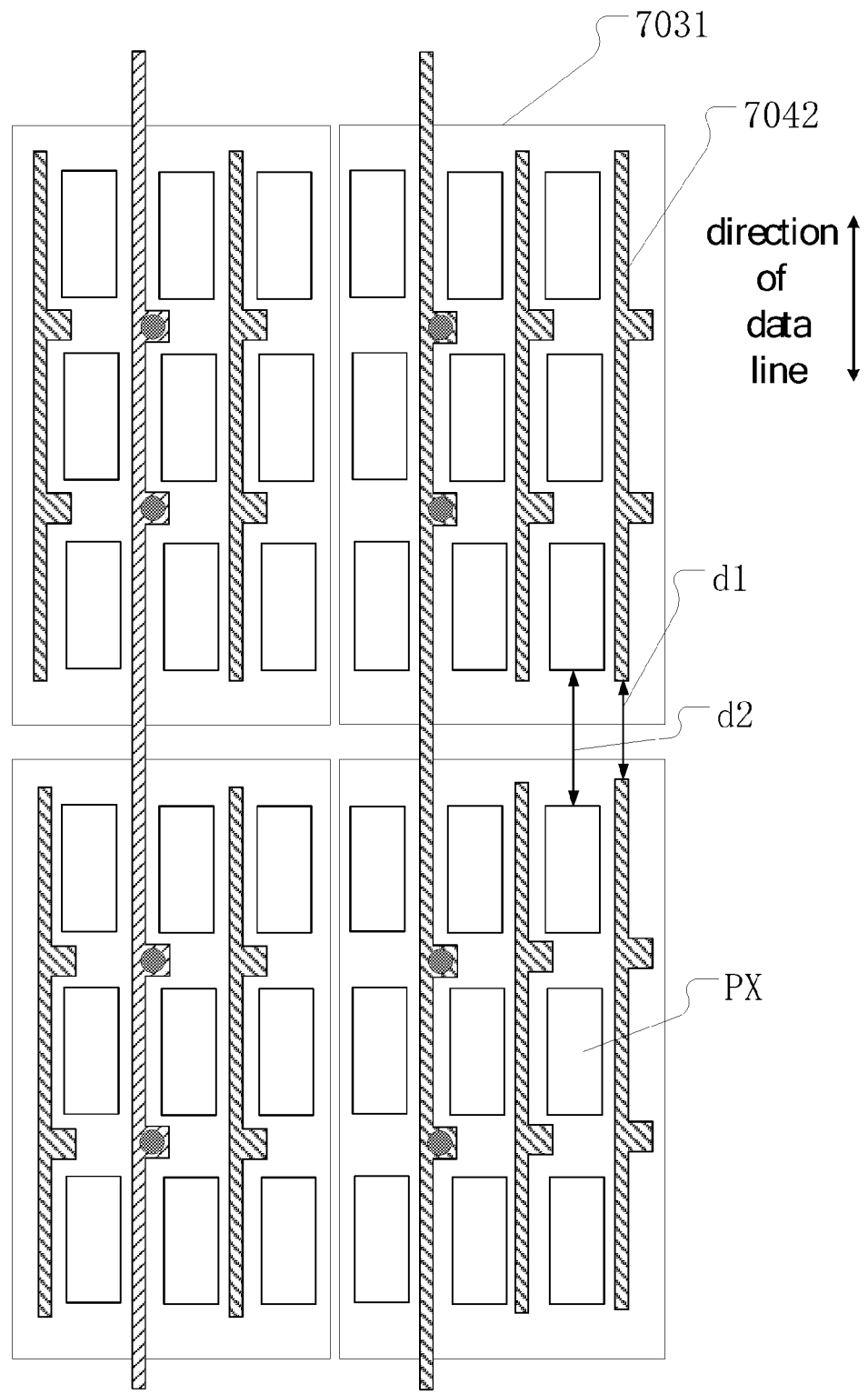
FIG. 7 is a schematic view of at least one embodiment of the touch-display panel according to the present disclosure.

Alternatively, FIG. 7 is a schematic view of at least one embodiment of the touch-display panel according to the present disclosure. As shown in FIG. 7, in the direction of data line, there is a first interval d1 between two adjacent dummy touch signal wires 7042, and the first interval d1 is about 8 to 12 micrometers in the direction of data line.

More particularly, in the direction of data line, the distance between two adjacent dummy touch signal wires 7042 is 8 to 12 micrometers so as to lower the risk for a short circuit between adjacent dummy touch signal wires, and thus the load capacitance between adjacent touch electrodes 7031 would not be increased. When the distance between two adjacent dummy touch signal wires 7042 in the direction of data line is less than 8 micrometers, the adjacent dummy touch signal wires will be wired during the production process of the dummy touch signal wires, which will lead to a short circuit. When the distance between two adjacent dummy touch signal wires in the direction of data line is more than 12 micrometers, it would be difficult to maintain the uniform distribution of the spacers.

Alternatively, with reference to FIG. 7, there is a second interval d2 between two adjacent display pixels. The first interval d1 and the second interval d2 are partially overlapped in the direction of data line. In the present embodiment, there is no limitation on whether or not d1 is more than or equal to or less than d2 in the direction of data line. When the first interval and second interval are at least partially overlapped, the interval part between two dummy touch signal wires adjacent to each other in the direction of data line is located between two adjacent rows of display pixels or partly located between two adjacent rows of display pixels. Such arrangement facilitates the uniform distribution of dummy touch signal wires.

Figure 8:
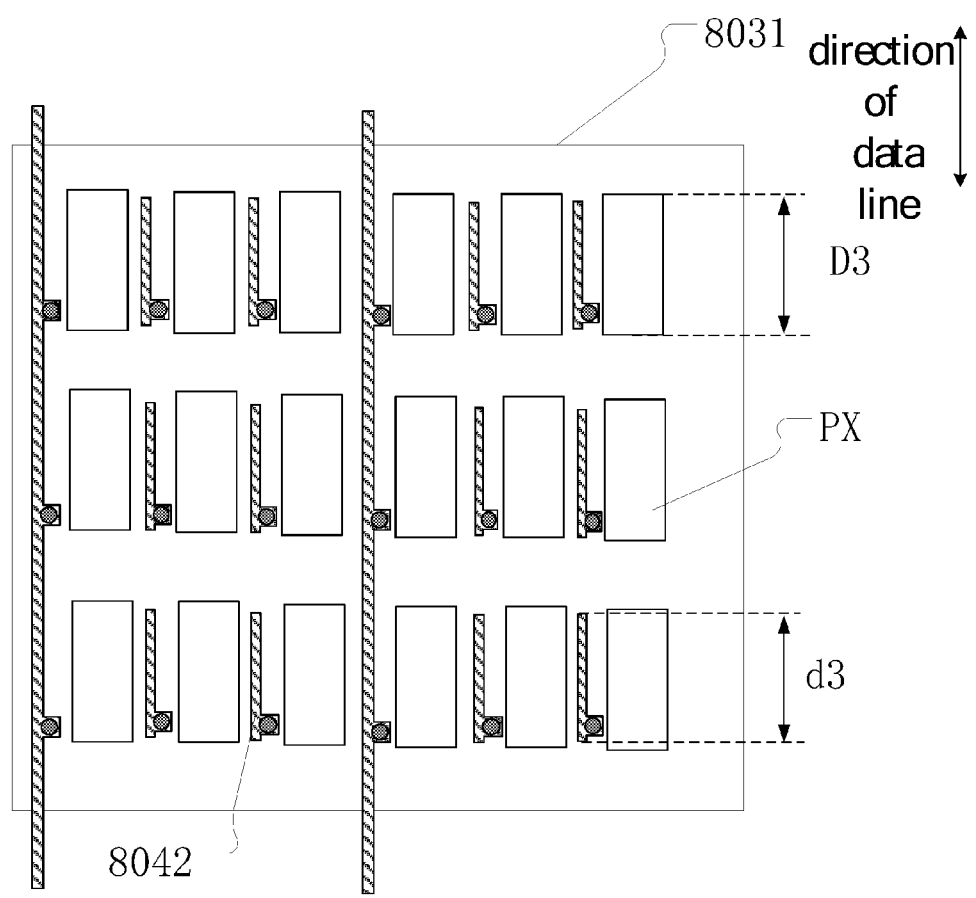
FIG. 8 is a schematic view of at least one embodiment of the touch-display panel according to the present disclosure.

Alternatively, FIG. 8 is a schematic view of at least one embodiment of the touch-display panel according to the present disclosure. As shown in FIG. 8, in the direction of data line, the length d3 of the dummy touch signal wire 8042 is less than or equal to the length D3 of the display pixel PX. When the dummy touch signal wire 8042 has a length equal to or less than that of display pixel PX in the direction of data line, more dummy touch signal wires maintain physically insulated therebetween. The more dummy touch signal wires are dispersed, the more the accumulation on the dummy touch signal wires by static electricity inside the touch-display panel can be prevented, so that the touch-display panel is protected from being destroyed by static electricity.

The present disclosure further provides a touch-display device, which includes any touch-display panel described above. The touch-display device has the related advantages of the above touch-display panel accordingly due to containing the touch-display panel as described above. The touch-display device is implemented in mobile phone, PC, notebook, tablet, electronic album, and the like.

The touch-display panel provides dummy touch signal wires and the first orthographic projections of the spacers on the plane of the touch signal wire layer are overlapped with the touch signal wires or dummy touch signal wires, so that the spacers have better flexibility of distribution, the cell thickness of liquid crystal cell is maintained more even. Therefore, the touch-display device including the touch-display panel provided by the present disclosure has better display effects.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents

What is claimed is:

1. A touch-display panel, comprising:
a first substrate and a second substrate disposed opposite with each other;
a touch electrode layer provided on the first substrate and comprising a plurality of touch electrodes provided in an array and insulated from each other;
a touch signal wire layer, including: a plurality of touch signal wires, and a plurality of dummy touch signal wires, wherein each dummy touch signal wire of the plurality of dummy touch signal wires has an orthographic projection on a plane of the touch electrode layer, and the orthographic projection is located within an area of one touch electrode of the plurality of touch electrodes; and
a plurality of spacers provided on a surface of the second substrate facing the first substrate, wherein:
the plurality of spacers has a plurality of first orthographic projections on a plane of the touch signal wire layer, and
among the plurality of first orthographic projections:
at least one first orthographic projection overlaps with at least one touch signal wire of the plurality of touch signal wires, and
at least another first orthographic projection overlaps with at least one dummy touch signal wire of the plurality of dummy touch signal wires; and
a control circuit configured to provide touch signals to each touch electrode of the plurality of touch electrodes; wherein
each touch signal wire of the plurality of touch signal wires electrically connects one touch electrode of the plurality of touch electrodes with the control circuit, and each touch electrode of the plurality of touch electrodes is electrically connected with at least one touch signal wire of the plurality of touch signal wires.

2. The touch-display panel according to claim 1, wherein each touch signal wire of the plurality of touch signal wires or each dummy touch signal wire of the plurality of dummy touch signal wires has at least one protrusion disposed on the first substrate, protruding in a direction intersecting an extending direction of each touch signal wire of the plurality of touch signal wires or each dummy touch signal wire of the plurality of dummy touch signal wires, and the first orthographic projection overlaps with the at least one protrusion.

3. The touch-display panel according to claim 1, wherein:
each spacer of the plurality of spacers includes a primary spacer and a secondary spacer; and
a height of the primary spacer is greater than a height of the second spacer.

4. The touch-display panel according to claim 2, further comprising an insulation layer disposed between the touch electrode layer and the touch signal wire layer, and the insulation layer has a plurality of via holes, through which the touch signal wires are electrically connected with the touch electrodes.

5. The touch-display panel according to claim 4, wherein:
each dummy touch signal wire of the plurality of dummy touch signal wires is electrically connected with a corresponding touch electrode of the plurality of touch electrodes through a corresponding via hole of the plurality of via holes.

6. The touch-display panel according to claim 5, wherein:
each via hole of the plurality of via holes has a second orthographic projection on the plane of the touch signal wire layer, and
the second orthographic projection overlaps with the at least one protrusion.

7. The touch-display panel according to claim 6, wherein:
the orthographic projection of each dummy touch signal wire of the plurality of dummy touch signal wires includes a third orthographic projection on the plane of the touch electrode layer, and
the third orthographic projection is located in an area of one touch electrode of the plurality of touch electrodes.

8. The touch-display panel according to claim 7, wherein:
at least one third orthographic projection is disposed in the area of each touch electrode of the plurality of touch electrodes.

9. The touch-display panel according to claim 8, further comprising:
a plurality of pixel units provided in an array; and
a plurality of data lines, wherein each data line of the plurality of data lines is configured to transmit a display signal to a corresponding pixel unit of the plurality of pixel units;
wherein each touch electrode of the plurality of touch electrodes is usable as a common electrode during displaying and the common electrode is configured to provide a common signal to the corresponding pixel unit of the plurality of pixel units.

10. The touch-display panel according to claim 9, wherein:
each touch signal wire of the plurality of touch signal wires and each dummy touch signal wire of the plurality of dummy touch signal wires has a same extension direction with the plurality of data lines.

11. The touch-display panel according to claim 10, wherein:
each touch signal wire of the plurality of touch signal wires or each dummy touch signal wire of the plurality of dummy touch signal wires is provided between two adjacent columns of the plurality of pixel units.

12. The touch-display panel according to claim 11, wherein:
a length of a dummy touch signal wire of the plurality of dummy touch signal wires, in the direction of the plurality of data lines, is less than or equal to a length of a touch electrode of the plurality of touch electrodes in the direction of the plurality of data lines.

13. The touch-display panel according to claim 12, wherein:
in the direction of the plurality of data lines, a first interval is provided between two adjacent dummy touch signal wires of the plurality of dummy touch signal wires, and
a length of the first interval in the direction of the plurality of data lines is substantially 8-12 micrometers.

14. The touch-display panel according to claim 13, wherein:
a second interval is provided between two adjacent rows of the plurality of pixel units, and
the first interval and the second interval at least partly overlap in the direction of the plurality of data lines.

15. The touch-display panel according to claim 11, wherein:
a length of a dummy touch signal wire of the plurality of dummy touch signal wires, in the direction of the plurality of data lines, is less than or equal to a length of a pixel unit of the plurality of pixel units in the direction of the plurality of data lines.

16. A touch-display device, comprising:
a touch display panel, wherein the touch display panel comprises:
a first substrate and a second substrate disposed opposite with each other;
a touch electrode layer provided on the first substrate and comprising a plurality of touch electrodes provided in an array and insulated from each other;
a touch signal wire layer, including: a plurality of touch signal wires, and a plurality of dummy touch signal wires, wherein each dummy touch signal wire of the plurality of dummy touch signal wires has an orthographic projection on a plane of the touch electrode layer, and the orthographic projection is located within an area of one touch electrode of the plurality of touch electrodes; and
a plurality of spacers provided on a surface of the second substrate facing the first substrate, wherein:
the plurality of spacers has a plurality of first orthographic projections on a plane of the touch signal wire layer, and
among the plurality of first orthographic projections:
at least one first orthographic projection overlaps with at least one touch signal wire of the plurality of touch signal wires, and
at least another first orthographic projection overlaps with at least one dummy touch signal wire of the plurality of dummy touch signal wires; and
a control circuit configured to provide touch signals to each touch electrode of the plurality of touch electrodes; wherein
each touch signal wire of the plurality of touch signal wires electrically connects one touch electrode of the plurality of touch electrodes with the control circuit, and each touch electrode of the plurality of touch electrodes is electrically connected with at least one touch signal wire of the plurality of touch signal wires.

17. The touch-display device according to claim 16, further comprising:
a plurality of pixel units provided in an array; and
a plurality of data lines, wherein each data line of the plurality of data lines is configured to transmit a display signal to a corresponding pixel unit of the plurality of pixel units;
wherein each touch electrode of the plurality of touch electrodes is usable as a common electrode during displaying and the common electrode is configured to provide a common signal to the corresponding pixel unit of the plurality of pixel units.

18. The touch-display device according to claim 17, wherein:
each touch signal wire of the plurality of touch signal wires or each dummy touch signal wire of the plurality of dummy touch signal wires is provided between two adjacent columns of the plurality of pixel units.

19. The touch-display device according to claim 16, wherein each touch signal wire of the plurality of touch signal wires or each dummy touch signal wire of the plurality of dummy touch signal wires has at least one protrusion disposed on the first substrate, protruding in a direction intersecting an extending direction of each touch signal wire of the plurality of touch signal wires or each dummy touch signal wire of the plurality of dummy touch signal wires, and the first orthographic projection overlaps with the at least one protrusion.

20. The touch-display device according to claim 19, wherein:
each dummy touch signal wire of the plurality of dummy touch signal wires is electrically connected with a corresponding touch electrode of the plurality of touch electrodes through a corresponding via hole of a plurality of via holes in an insulation layer, and the insulation layer is between the touch electrode layer and the touch signal wire layer.

* * * * *